United States Patent [19]
Buehler et al.

[11] Patent Number: 5,104,949
[45] Date of Patent: Apr. 14, 1992

[54] SUPPORTED POLYMERIZATION CATALYST

[75] Inventors: Charles K. Buehler, Naperville; Douglas D. Klendworth, Wauponsee Twp., Grundy County, both of Ill.

[73] Assignee: Quantum Chemical Corporation, New York, N.Y.

[21] Appl. No.: 733,910

[22] Filed: Jul. 22, 1991

Related U.S. Application Data

[62] Division of Ser. No. 498,313, Mar. 23, 1990.

[51] Int. Cl.$^5$ ............................................. C08F 4/685
[52] U.S. Cl. ................................... 526/116; 526/119; 526/351; 502/113
[58] Field of Search .................... 526/116, 119

[56] References Cited

U.S. PATENT DOCUMENTS

| | | | |
|---|---|---|---|
| 4,154,701 | 5/1979 | Melquist | 252/429 B |
| 4,429,087 | 1/1984 | Capshew | 526/119 |
| 4,508,843 | 4/1985 | Etherton et al. | 502/115 |
| 4,649,483 | 3/1987 | Tachikawa et al. | 526/97 |
| 4,686,199 | 8/1987 | Tachikawa et al. | 502/104 |
| 4,831,090 | 5/1989 | Bachl et al. | 526/116 |
| 4,950,631 | 7/1989 | Buehler et al. | 502/119 |

Primary Examiner—Patrick P. Garvin
Assistant Examiner—Brent M. Peebles
Attorney, Agent, or Firm—Kenneth D. Tremain; Richard G. Jackson

[57] ABSTRACT

A catalyst useful in the polymerization of olefins is disclosed. The catalyst is produced by initially treating an inert inorganic compound to remove surface hydroxy groups. The thus treated inorganic compound is contacted with a hydrocarbon soluble magnesium compound in a second step. The product of this second step is contacted with a modifying compound selected from the group consisting of silicon halides, boron halides, aluminum halides, alkyl silicon halides, hexaalkyl disilazanes and mixtures thereof in a third step. The product of this third step is contacted a vanadium compound having the structured formula $V(O)_sX^1_{4-s}$, where $X^1$ is halogen; and s is 0 or 1, a first titanium-containing compound having the structural formula $Ti(OR^2)_nX^2_m$, where $R^2$ is hydrocarbyl; $X^2$ is halogen; n is an integer of 1 to 4; and m is 0 or an integer of 1 to 3, with the proviso that the sum of n and m is 4, and a second titanium-containing compound having the structural formula $TiX^3(OR^3)_q$, where $X^3$ is halogen; $R^3$ is hydrocarbyl; p is an integer of 1 to 4; and q is 0 or an integer of 1 to 3, with the proviso that the sum of p and q is 4 and that the first and the second titanium-containing compounds are not identical.

A process for polymerizing olefins, using the catalyst of this disclosure is also provided.

29 Claims, No Drawings

SUPPORTED POLYMERIZATION CATALYST

This is a divisional of copending application Ser. No. 498,313, filed on Mar. 23, 1990.

BACKGROUND OF THE INVENTION

1. Field of the Invention

The instant invention is directed to a catalyst useful in the polymerization of olefins. More particularly, the instant invention is directed to a catalyst, useful in the polymerization of olefins, wherein magnesium, vanadium and titanium compounds are disposed on an inert support.

2. Background of the Prior Art

The polymerization of olefins using Ziegler-Natta catalysts is almost universely employed. These catalysts provide polyolefins having desired characteristics in high yield. However, because of the myriad applications to which polyolefins are used, no single class of catalyst provides polymers having the specific desired utility.

A characteristic, however, common to many olefin polymerization catalysts in the prior art is the incorporation therein of internal electron donors. These compounds are utilized in applications which require high isotacticity. The presence of internal electron donors, however, creates difficulties in the use of the catalyst and the product produced. Those skilled in the art are aware that unless the amount and type of electron donor compound is carefully selected not only is stereoregularity of the resultant polymer deficient but poor catalytic activity often results. This detrimental effect occurs even if the catalyst is formed with the proper electron donor compound in the correct concentration added in the wrong sequence.

The utilization of electron donor compounds often create additional problems involving offensive odors in the final polymeric product. This unfortunate result obtains even if the ideal electron donor, provided in the correct concentration and introduced in proper sequence in the catalyst formation process, is utilized. Thus, polymers formed from catalysts which include an electron donor compound must oftentimes be deashed or deodorized in order to insure that there is no odor given off by the final polymeric product.

Another disadvantage identified in the prior art is the use of magnesium halide supports. Such supports are commonly utilized in the polymerization of propylene. This important class of olefins is oftentimes polymerized by a magnesium halide supported catalyst because of the advantageous results noted with such catalysts. Unfortunately, the use of such a support has adverse effects.

These adverse effects are partially ascribable to the corrosive nature of this compound. Molding machines which process polymers formed from polymerizations catalyzed by magnesium halide supported catalysts are subject to corrosion due to the corrosive nature of the polymer which includes magnesium halide supported catalyst therein. Moreover, the adverse effect of this corrosion is not limited to damage to expensive molding machinery. Equally significant, the polyolefinic molded article processed by this molding machinery is in many cases characterized by aesthetic flaws.

Very recently, a patent application assigned to the assignee of the present application was developed which addressed the issues discussed above. That is, a new catalyst was developed which produces olefinic polymers, particularly propylene polymers, of high stereoregularity, uniform particle size distribution, good spherical morphology and high bulk density. Although this invention, embodied in U.S. patent application, Ser. No. 326,708, filed Mar. 21, 1989, which is a continuation of U.S. patent application, Ser. No. 99,190, filed Sept. 21, 1988, now abandoned, also represents an advance in the art in terms of olefinic polymer productivity, that catalyst does not produce a polymer that can rapidly be processed in such applications as injection molded applications to produce products in the high rate required for commercialization.

The above remarks establish that there is a continuing need in the art for catalysts useful in the polymerization of olefins that not only eliminate the problems associated with corrosive supports and the formation of catalysts utilizing internal electron donors but, in addition, produce olefinic polymers having melt indeces or melt flow rates such that injected molded products can be produced in high yield.

BRIEF SUMMARY OF THE INVENTION

The present invention is directed to catalysts having excellent characteristics which, in addition, when added to olefin polymerization reactors, produce olefinic polymers which are characterized by melt indeces and melt flow rates in a range such that injected molding operations using such polymers are optimized.

In accordance with the present invention, a catalyst is provided. The catalyst comprises a product obtained by treating an inert inorganic to remove an surface hydroxyl groups thereon. The thus treated inert inorganic compound is contacted with at least one hydrocarbon soluble magnesium compound. The product of this contact is, in turn, contacted with a modifying compound selected from the group consisting of silicon halides, boron halides, aluminum halides, alkyl silicon halides and mixtures thereof. The product of this contact is next contacted with a halogen-containing vanadium compound having the structural formula $V(O)_s X^1_{4-s}$, where $X^1$ is halogen; and s is 0 or 1; a first titanium-containing compound having the structural formula $Ti(OR^2)_n X^2_m$, where $R^2$ is hydrocarbyl, $X^2$ is halogen; n is an integer of 1 to 4; and m is 0 or an integer of 1 to 3 with the proviso that the sum of n and m is 4; and a second-containing titanium compound having the structural formula $TiX^3_p(OR^3)_q$ where $X^3$ is halogen; $R^3$ is hydrocarbyl; p is an integer of 1 to 4; and q is 0 or an integer of 1 to 3 with the provisos that the sum of p and q is 4 and that the first and the second titanium-containing compounds are not identical.

In another aspect of the present invention, a process for polymerizing an olefin is disclosed. In this process at least one olefin is polymerized under olefinic polymerization conditions utilizing the catalyst of the present invention along with a first co-catalyst, an aluminum-containing compound, and a second co-catalyst, a silane compound.

DETAILED DESCRIPTION

The catalyst of the present invention is prepared by treating an inert inorganic compound, preferably selected from the group consisting of silica, alumina, titania and zirconia, of which silica is most preferred, to remove surface hydroxyl groups. To this end, the treatment of the inorganic compound involves either subjecting the inert inorganic compound to elevated temperature in an inert atmosphere or to initially contacting the inert inorganic compound with hexamethyldisilazane followed by the aforementioned heating step.

The heating step utilized in the treatment of the inert inorganic compound involves exposure of the inorganic compound to a temperature in the range of between about 100° C. and about 150° C. for a period in the range of between about 30 minutes and 3 hours. Preferably, the heating step occurs at a temperature in the range of between about 100° C. and about 135° C. for a period in the range of between about 40 minutes and about 2 hours. Most preferably, the heating step involves exposure of the inert inorganic compound to a temperature in the range of between about 100° C. and 120° C. for a period in the range of between about 45 minutes and about 1.5 hours. In order to ensure an inert environment, it is preferred that this heating step occur in an inert gas atmosphere. Preferably, the inert gas is provided by nitrogen.

The thus treated inert inorganic compound, utilized as the support for the catalyst, is contacted with at least one hydrocarbon soluble magnesium compound in the second step of the process of forming the catalyst of the present invention. The hydrocarbon soluble magnesium compound is preferably characterized by the structural formula

$$Mg(OR)_rX_t \qquad (I)$$

where R is hydrocarbyl; X is halogen; r is 1 or 2; and t is 0 or 1. More preferably, R is $C_1$–$C_{12}$ alkyl; X is bromine or chlorine. Even more preferably, structural formula I is characterized by R being $C_4$–$C_{10}$ alkyl; X being chlorine; and r and s being 1. Among the preferred hydrocarbon soluble magnesium compounds contemplated for use in the formation of the catalyst of this invention are 2-methylpentyloxymagnesium chloride, pentyloxymagnesium chloride, di-2-ethylhexyloxymagnesium and the like.

The contact between the treated inert inorganic compound utilized as a support and the hydrocarbon soluble magnesium compound occurs at elevated temperature. Preferably, the temperature of this contact is in the range of between about 40° C. and about 130° C. More preferably, the temperature of this contact is in the range of between about 50° C. and about 120° C. The duration of this contact is in the range of between about 20 minutes and about 5 hours. Preferably, the duration of the contact between the magnesium compound and the inert inorganic support compound is in the range of between about 1 hour and about 4 hours. More preferably, the duration of this contact is in the range of between about 2 hours and about 3 hours.

In a particularly preferred embodiment of the present invention contact between the magnesium compound and the inorganic compound occurs in discrete heating steps. That is, the temperature of contact is initially in the range of between about 40° C. and about 80° C. Contact at this temperature range occurs over a period in the range of between about 10 minutes and about 1 hour. This is followed by contact at a temperature in the range of between about 60° C. and about 100° C., again for a period in the range of between about 10 minutes and about 1 hour. Finally, the temperature is again raised to between about 80° C. and about 120° C. for a period of 1 to 2 hours. In this latter heating step the solvent, in which, in a preferred embodiment, the hydrocarbon soluble magnesium compound is dissolved, is distilled off. Contact terminates with the removal of all the solvent. At this point the product, a solid having flour-like consistency, is cooled to ambient temperature.

In the third step of the process of forming the catalyst, the product of the second step, a solid having flour-like consistency, is contacted with a modifying compound selected from the group consisting of silicon halides, boron halides, aluminum halides, alkyl silicon halides and mixtures thereof. Of these modifying compounds, silicon halides, boron halides and aluminum halides are preferred. Of these preferred halides, the chlorides are particularly preferred. Thus, silicon tetrachloride, boron trichloride, and aluminum trichloride are particularly preferred. Of these, silicon tetrachloride is most preferred.

The contact between the modifying compound or compounds and the product of the second step of the process of forming the catalyst of this invention, the contact between the inert inorganic compound and the soluble magnesium compound, occurs at a temperature in the range of between about 15° C. and about 100° C. over a period in the range of between about 15 minutes and about 3 hours. More preferably, this contact occurs at a temperature in the range of between about 20° C. and about 80° C. for a period in the range of between about 30 minutes and about 2 hours.

In a particularly preferred embodiment, just as in the second step, this third step occurs in temperature sequences. In this step, two temperature sequences are utilized. The first temperature sequence, which occurs over a period of between about 10 minutes and about 1.5 hours, involves contact of the modifying compound and the product of the second step at a temperature in the range of between about 15° C. and about 50° C. This is followed by contact for an equal period of time, about 10 minutes to about 1.5 hours, at a temperature in the range of between about 30° C. and about 100° C.

It is noted that, as in the second step where the soluble magnesium compound is preferably introduced as a solution, the modifying compound is also preferred contacted in solution. In a preferred embodiment the solvent is a hydrocarbon, preferably an alkane containing 5 to 9 carbon atoms. In a particularly preferred embodiment of the present invention this solvent is heptane. It is emphasized that the solvent preferred for use in the second step, wherein the soluble magnesium compound is introduced as a solution also utilizes a hydrocarbon solvent, preferably an alkane containing 5 to 9 carbon atoms. Again, in that step heptane is particularly preferred.

Upon completion of this contact, heating is turned off and the solid product of this contact is allowed to settle in the liquid in which it is disposed. The liquid, in a preferred embodiment, is thereupon removed. Any method of liquid removal, such as decantation, can be utilized. However, in a preferred embodiment, siphoning is employed to remove the liquid above the solid.

In a preferred embodiment the product of this third step is washed. Washing involves the addition of an organic solvent which removes organic impurities. The organic solvent is preferably a hydrocarbon. More preferably, the solvent is an alkane containing 5 to 9 carbon atoms. Most preferably, the alkane is heptane.

In the preferred embodiment where in the product of the third step is subject to washing, the organic solvent is added to the solids in an amount sufficient to completely immerse the solid product therein. During contact between the solvent and the solid product of the third processing step stirring is preferably provided. The solvent and the solids are contacted in this first preferred washing step for about 1 to about 10 minutes. Upon completion of this time the solids are allowed to settle to the bottom of the slurry. Thereupon, the organic solvent is removed by any suitable method such as decantation or siphoning. Preferably, the liquid is removed by siphoning.

The above first preferred washing procedure is repeated. Typically, this washing procedure is repeated for a total of between about 2 and about 5 times. Three duplications of this first preferred washing step are particularly preferred.

Whether the product of the third step in the catalyst forming process is washed or not, the next essential step, the fourth processing step, involves contact of the washed or unwashed product with a vanadium-containing compound having the structural formula

$$V(O)_s X^1_{4-s} \qquad (II)$$

where $X^1$ is halogen; and s is 0 or 1. In a preferred embodiment, $X^1$ is fluorine, chlorine or bromine. Of these, bromine and chloride are preferred, with chlorine being most preferred. It is particularly preferred that the vanadium compound be vanadium oxychloride or vanadium tetrachloride.

The washed or unwashed product of the third processing step is also contacted, in this fourth step, with a first titanium-containing compound having the structural formula

$$Ti(OR^2)_n X^2_m \qquad (III)$$

$R^2$ is hydrocarbyl; X is halogen; n is an integer of 1 to 4; and m is 0 or an integer of 1 to 3 with the proviso that the sum of n and m is 4. Thus, the titanium compound having the structural formula III encompasses tetrahydrocarbyloxytitaniums, trihydrocarbyloxytitanium halides, dihydrocarbyloxytitanium dihalides and hydrocarbyloxytitanium trihalides.

More preferably, compound III is characterized by $R^2$ being alkyl, aryl, aralkyl or alkaryl; n is 4 and m is 0. Still more preferably, $R^2$ is alkyl or alkaryl.

Among the particularly preferred titanium compounds within the contemplation of structural formula III are tetracresyltitanate, titanium tetrabutoxide, titanium tetranonolate, tetra-2-ethylhexyltitanate, tetraisobutyltitanate, tetra-n-propyltitanate, tetraisopropyltitanate and the like. Of these compounds tetracresyltitanate is particularly preferred.

In addition to the vanadium-containing compound, having the structural formula II, and the first titanium-containing compound, having the structural formula III, contact of the product of the third processing step, in this fourth step, also occurs with a second titanium-containing compound having the structural formula

$$TiX^3_p(OR^3)_q \qquad (IV)$$

where $X^3$ is halogen; $R^3$ is hydrocarbyl; p is an integer of 1 to 4; and q is 0 or an integer of 1 to 3 with the proviso that the sum of p and q is 4. Although this second titanium-containing compound encompasses titanium tetrahalides, hydrocarbyloxytitanium trihalides, dihydrocarbyloxytitanium dihalides and trihydrocarbyloxytitanium halides, it is emphasized that the two titanium-containing compounds having the structural formulae III and IV are not identical.

In a preferred embodiment, the titanium compound having the structural formula IV is characterized by $X^3$ being chlorine or bromine; p being 4; and q being 0. Of the two compounds within the contemplation of this preferred embodiment, titanium tetrachloride and titanium tetrabromide, titanium tetrachloride is particularly preferred.

In this fourth step where the product of the third processing step is contacted with compounds having the structural formulae II, III and IV, the order or sequence of contact is immaterial. That is, in one preferred embodiment all three compounds are contacted with the product of the third processing step simultaneously or as a mixture. In a second preferred embodiment, the vanadium compound initially contacts the product of the third step followed by contact with the first titanium-containing compound and thereafter by the second titanium-containing compound. In another preferred embodiment this sequence is reversed, that is, the second titanium-containing compound initially contacts the product of the third step followed by the first titanium-containing compound and lastly by the vanadium-containing compound. In yet another embodiment of the present invention, contact occurs between the product of the third step and the first titanium-containing compound followed by the vanadium compound and terminating with contact with the second titanium-containing compound. It is unnecessary to go through the other possible combinations. Suffice it to say, any order of contacting of the three compounds is within the contemplation of the present invention. Of these methods of contact, sequential contact with the vanadium compound, the first titanium compound and the second titanium compound in that order is particularly preferred.

In the preferred embodiment wherein all three compounds are added simultaneously or as a mixture, contact occurs over a period of between about 15 minutes and about 3 hours at a temperature in the range of between about 40° C. and about 140° C. Preferably, the duration of contact is in the range of between about 30 minutes and about 2 hours at a temperature in the range of between about 60° C. and about 120° C. More preferably, the duration of contact is in the range of between about 45 minutes and about 1.5 hours at a temperature in the range of between about 80° C. and about 100° C.

In the preferred embodiment wherein the three compounds contact the product of the third processing step in sequence, independent of the order of contact, the first step involves contact of the product of the third processing step with the first contacting compound over a period of between about 30 seconds and about 5 minutes. The product of this contact is in turn contacted with a second contacting compound over a period of between about 2 minutes and about 10 minutes. Both of these first two contacts preferably occur at ambient temperature. The final step, the addition of the third contacting compound occurs over a duration and a temperature range substantially identical with that utilized when the three contacting compounds are introduced simultaneously.

The three contacting compounds may be added near or as a solution. In a preferred embodiment, the vanadium-containing compound and the second titanium-containing compound contact the product of the third step or a product of contact with that product is the pure compound, that is neat. The first titanium-containing compound preferably contacts the product of the third processing step or a product of contact with that product in solution. Preferably, the solvent of that solution is a hydrocarbon, preferably an alkane having 5 to 9 carbon atoms. Most preferably, that alkane is heptane.

Independent of the method of contact of the three compounds with the product of the third step, the product of this fourth step is preferably washed. In the preferred embodiment, where washing of the product of the fourth step occurs, the procedure for washing is identical with the procedure for washing the product of the third processing step. However, whereas the first washing step occurs in 2 to 5 stages, the preferred second washing step, the washing of the solids of the product of the fourth processing step, occurs, in a preferred embodiment, in about 5 to about 10 washing stages, i.e., separate charges of organic solvent.

The following examples are given to illustrate the scope of the present invention. Because these examples are given for illustrative purposes only, the invention embodied herein should not be limited to these examples.

EXAMPLE 1

Preparation of Catalyst

Silica (5 g.) pretreated with hexamethyldisilazane, was disposed in a 250 ml., three-necked round bottomed flask equipped with a nitrogen purge, a paddle stirrer, a heptane inlet, a nitrogen inlet, a thermometer and a siphon. Upon the addition of the silica, nitrogen was slowly introduced into the flask to provide a nitrogen atmosphere. The flask and its contents were then heated to 110° C. for one hour. Thereupon, the flask and its silica-containing contents were cooled to ambient temperature.

To the flask was added 2-methylpentyloxymagnesium chloride (45 ml. of an 0.9M solution in heptane). The thus formed slurry was heated ar 60° C. for 30 minutes followed by increasing the temperature to 80° C. which was maintained for an additional 30 minutes. Thereafter, the temperature was raised to 100° C. until all the solvent was distilled off. At this point, the solid product had a flour-like consistency. The heating step at 100° C. to remove all the solvent took approximately 1.5 hours. All these contacting steps occurred with stirring. At the termination of contact at 100° C., stirring was stopped and the flask and its contents cooled to ambient temperature.

The cooled product in the flask was next contacted with heptane (20 ml.) followed by the addition of silicon tetrachloride (4.5 ml.). The thus formed slurry was stirred and the contents of the flask heated for 30 minutes at 25° C. At this point, the temperature was increased to 60° C. and heating continued for an additional 30 minutes. At this point, heating was stopped and the stirrer was turned off.

The cooled solid in the flask was allowed to settle. The liquid above the solid was siphoned off and heptane (70 ml.) added thereto. Stirring at room temperature was initiated and continued for 5 minutes. Thereupon the solids in the slurry were allowed to settle. The heptane was siphoned off and the washing procedure was repeated. Three such washings sequences were conducted.

The washed product, a solid, was then contacted with vanadium oxychloride (0.1 ml.) at ambient temperature and mixed therewith for one minute. Thereupon, tetracresyltitanate (3.0 ml., introduced as a 50 volume percent solution in heptane) was added. Mixing was initiated and continued for 5 minutes, again at ambient temperature. At that time, titanium tetrachloride (10 ml.) was added. The resultant slurry was stirred and heating was turned on. The contents of the flask were heated at a temperature of 90° C. This heating, with stirring, continued for one hour. At that C. time, the heating was turned off and stirring was stopped. The liquid contents of the flask were then removed by siphon.

The solid product remaining was washed about 9 times with heptane (80 ml. in each wash sequence) in accordance with the procedure recited above. That is, each washing sequence constituted charging heptane to the solids, mixing the resultant slurry, which was continued for about 5 minutes, followed by settling of the solids and removing the solvent by siphoning.

The product of this process was analyzed to determine its elemental constituency. This analysis is included in Table 1.

EXAMPLE 2

Preparation of Catalyst

A catalyst was prepared utilizing the procedure of Example 1 except that the volume of vanadium oxychloride added to the product of contact of the third processing step was 0.2 ml., rather than the 0.1 ml. introduced in Example 1.

An elemental analysis of the product of Example 2 is included in Table 1.

EXAMPLE 3

Preparation of Catalyst

A catalyst was prepared in exact accordance with the procedure of Example 1 except that the volume of vanadium oxychloride liquid utilized in this example was 0.4 ml. rather than the 0.1 ml. utilized in Example 1.

An elemental analysis of the product of Example 3 is included in Table 1.

COMPARATIVE EXAMPLE 1

Preparing of a Non-Inventive Catalyst

A catalyst was made in accordance with Example 1 except that the washed product of the third processing step, the product of contact with silicon tetrachloride, was contacted with 10 ml. vanadium oxychloride rather than the 0.1 ml. utilized in Example 1. Moreover, neither tetracresyltitanate nor titanium tetrachloride were contacted with the product of the third contacting step. That is, the fourth contacting step included only the inclusion of vanadium oxychloride. The excess vanadium oxychloride was removed in the washings which occurred subsequent to the addition of the contact with vanadium oxychloride.

An analysis of the product of this example is included in Table 1.

COMPARATIVE EXAMPLE 2

Preparation of a Prior Art Catalyst

A catalyst was produced in accordance with the procedure of Example 1 except that vanadium oxychloride was omitted from contact with the product of the third contacting step. It is emphasized that the addition of tetracresyltitanate and titanium tetrachloride were in accordance with the procedure utilized in Example 1.

An elemental analysis of the catalytic product of Comparative Example 2 appears in Table 1.

TABLE 1

Elemental Analysis of Catalysts

| Catalyst of Example No. | Mg, % by Wt | Ti, % by Wt | V, % by Wt |
|---|---|---|---|
| 1 | 7.8 | 4.2 | 1.4 |
| 2 | 6.8 | 3.6 | 2.0 |
| 3 | 4.2 | 3.9 | 2.75 |
| CE1 | 1.8 | -0- | 10.5 |
| CE2 | 4.2 | 3.9 | -0- |

EXAMPLE 4

Polymerization of Propylene

A reactor was initially purged with nitrogen. To the purged reactor was added heptane (20 ml.), followed by the introduction of triethylaluminum (0.8 ml., introduced as a 1.5M solution in heprane). Isobutylisopropyldimethoxysilane (0.1 ml., introduced as a 1M solution in heptane) was next charged into the reactor followed by the charging of the solid catalyst of Example 1 (20 mg.). Hydrogen gas (200 ml.) was introduced into the reactor from an 80 psig pressurized hydrogen gas cylinder. Finally, propylene (325 g.) was added to the reactor.

The reactor was pressurized to 460 psig. and heated to 70° C. The contents of the reactor were stirred by a stirrer rotating at 400 revolutions per minute. These conditions were maintained for one hour during which time the propylene was polymerized to polypropylene.

The weight of polypropylene polymerized, its insolubility in heptane, measured as a percent by weight, and its melt flow rate, as measured by ASTM D-1238, is summarized in Table 2. It is emphasized that each of the tabulated results are an average of two runs.

EXAMPLES 5 and 6 and COMPARATIVE EXAMPLES 3 and 4

Polymerization of Propylene

Polymerizations conducted in accordance with the procedure of Example 4, were conducted employing the catalysts produced in accordance with Examples 2 and 3 and Comparative Examples 1 and 2. As in Example 4, each of these polymerization experiments were repeated.

The results of the average results of two runs are reported in Table 2.

TABLE 2

| Polymerization Example No. | Catalyst of Ex. No. | Activity, gPP/gCat-Hr | Heptane Insol., % by Wt. | Melt Flow Rate |
|---|---|---|---|---|
| 4 | 1 | 11,500 | 97.8 | * |
| 5 | 2 | 9,650 | 95.6 | 2.96 |
| 6 | 3 | 12,000 | 95.7 | 3.75 |
| CE3 | CE1 | No Polymerization Occurred | | |
| CE4 | CE2 | 10,000 | 96.0 | 2.0 |

*Not Measured

The above embodiments and examples are given to illustrate the scope and spirit of the instant invention. These embodiments and examples will make apparent, to those skilled in the art, other embodiments and example. These other embodiments and examples are within the contemplation of the present invention. Therefore, the present invention should be limited only by the appended claims.

What is claimed is:

1. A process for making an olefinic polymer comprising polymerizing at least one olefin under olefin polymerization conditions in the presence of
   (I) a cavity component comprising the product produced by the steps of
      (a) treating an inert inorganic compound to remove surface hydroxyl groups;
      (b) contacting the treated inert inorganic compound with a hydrocarbon soluble magnesium compound;
      (c) contacting the product of said step (b) with a modifying compound selected from the group consisting of silicon halides, boron halides, aluminum halides, alkyl silicon halides, hexaalkyl disilazanes and mixtures thereof; and
      (d) contacting the product of said step (c) with a vanadium compound having the structural formula $V(O)_2X^1_{4-s}$, is halogen and s is 0 or 1; a first titanium-containing compound having the structural formula $Ti(OR^2)_nX^2_m$, where $R^2$ is hydrocarbyl, $X^2$ is halogen, n is an integer of 1 to 4, and m is 0 or an integer of 1 to 3 with the priviso that the sum of n and m is 4; and a second titanium-containing compound having the structural formula $TiX^3_p(OR^3)_q$, where $^3$ is halogen, $R^3$ is hydrocarbyl, p is an integer of 1 to 4, and q is 0 or an integer of 1 to 3, with the provisos that the sum of p and q are 4 and that said first and said second titanium-containing compounds are not identical;
   (II) an aluminum compound; and
   (III) a silane compound.

2. A process in accordance with claim 1 wherein said inert inorganic support is selected from the group consisting of silica, alumina, titania and zirconia.

3. A process in accordance with claim 1 wherein said treatment of step (a) comprises heating said inert inorganic support to a temperature in the range of between about 100° C. and about 150° C. for a period of between about 30 minutes to about 3 hours.

4. A process in accordance with claim 3 wherein said inert inorganic support is silica pretreated with hexamethyl disilazane prior to said heating step.

5. A process in accordance with claim 1 wherein said hydrocarbon soluble magnesium compound has the structural formula $Mg(OR)_rX_t$, where R is hydrocarbyl; X is halogen; r is 1 or 2; and t is 0 or 1.

6. A process in accordance with claim 5 wherein R is $C_1$-$C_{12}$ alkyl; and X is chloride or bromine.

7. A process in accordance with claim 6 wherein R is $C_4$-$C_{10}$ alkyl; X is chlorine; and r and t are 1.

8. A process in accordance with claim 1 wherein said step (b) occurs at a temperature in the range of between about 40° C. and about 130° C. for a period in the range of between about 20 minutes and about 5 hours.

9. A process in accordance with claim 1 wherein said modifying compound is selected from the group consisting of silicon halides, boron halides and aluminum halides.

10. A process in accordance with claim 9 wherein said modifying compound is selected from the group consisting of silicon tetrachloride and silicon tetrabromide.

11. A process in accordance with claim 1 wherein said step (c) occurs at a temperature in the range of between about 15° C. and about 100° C. over a period in the range of between about 15 minutes and about 3 hours.

12. A process in accordance with claim 1 wherein said product of said step (c) is washed with an organic solvent.

13. A process in accordance with claim 1 wherein said vanadium compound is selected from the group consisting of vanadium oxychloride and vanadium tetrachloride.

14. A process in accordance with claim 1 wherein said first titanium-containing compound is characterized by $R^2$ being alkaryl or alkyl; n being 4; and m being 0.

15. A process in accordance with claim 1 wherein said second titanium-containing compound is characterized by $X^3$ being chlorine or bromine; p being 4; and q being 0.

16. A process in accordance with claim 1 wherein said step (d) occurs at a temperature in the range of between about 40° C. and about 140° C. over a period in the range of between about 15 minutes and about 3 hours.

17. A process in accordance with claim 1 wherein the product of step (c) is contacted with said vanadium compound and said first and said second titanium-containing compounds simultaneously or as a mixture.

18. A process in accordance with claim 1 wherein said vanadium compound and said first and said second titanium-containing compounds contact said product of said step (c) consecutively in any order.

19. A process in accordance with claim 18 wherein said product of said step (c) is contacted with said vanadium compound, the product of which is contacted with said first titanium-containing compound which product is contacted with said second titanium-containing compound.

20. A process in accordance with claim 1 comprising washing said product of said step (d) with an organic solvent.

21. A process for making an olefinic polymer comprising polymerizing at least one olefin under olefin polymerization conditions in the presence of
(I) a catalyst component comprising the product produced by the steps of:
  (a) heating silica to remove surface hydroxyl groups;
  (b) contacting the silica product of step (a) with a hydrocarbon soluble magnesium compound having the structural formula $Mg(OR)_rX_t$, where R is hydrocarbyl, X is halogen, r is 1 or 2, and t is 0 or 1;
  (c) treating the product of step (b) with a modifying compound selected from the group consisting of silicon halides boron halides and aluminum halides; and
  (d) contacting the product of step (c) with a halogen-containing vanadium compound having the structural formula $V(O)_sX^1_{4-s}$, $X^1$ is bromine or chlorine, and s is 0 or 1; a titanium ester having the structural formula $Ti(OR^2)_4$, where $R_2$ is alkyl or alkaryl, and a titanium halide having the structural formula $TiX^3_4$, where $X^3$ is bromine or chlorine;
(II) an aluminum compound selected from the group consisting of an aluminum alkyl and an alkylaluminum halide; and
(III) a silane compound having the structural formula $R^4_u(OR^5)_{4-u}$ Si, where $R^4$ and $R^5$ are the same or different and are hydrocarbyl, and u is an integer of 1 to 3.

22. A process in accordance with claim 21 wherein said silica is heated to a temperature in the range of between about 100° C. and about 135° C. for a period of between about 40 minutes and about 2 hours.

23. A process in accordance with claim 22 wherein said silica is pretreated with hexamethyl disilazane prior to said heating step.

24. A process in accordance with claim 21 wherein R is $C_4$-$C_{10}$ alkyl; and X is chlorine.

25. A process in accordance with claim 24 wherein said hydrocarbon soluble magnesium compound is 2 methylpentyloxymagnesium chloride.

26. A process in accordance with claim 21 wherein said halogen-containing vanadium compound is selected from the group consisting of vanadium oxychloride and vanadium tetrachloride; said titanium ester is tetracresyl titanate; and said titanium halide is titanium tetrachloride.

27. A process in accordance with claim 21 wherein said product of said step (d) is washed with an alkane containing between about 5 and about 9 carbon atoms.

28. A process for making an olefinic polymer comprising polymerizing at least one olefin under olefin polymerization conditions in the presence of
(I) a catalyst component comprising the product produced by the steps of
  (a) heating silica at a temperature in the range of between about 100° C. and about 120° C. for a period in the range of between about 45 minutes and about 1.5 hours;
  (b) contacting the heated silica with 2-methylpentyloxymagnesium chloride initially at a temperature in the range of between about 40° C. and about 80° C. for a period in the range of between about 20 minutes and about 1 hour, followed by heating at a temperature in the range of between about 60° C. and about 100° C. for a period in the range of between about 10 minutes and about 1 hour, followed by heating at a temperature in the range of between about 80° C. and about 120° C. for a period in the range of between about 1 hour and about 2 hours.
  (c) contacting the product of step (b) with silicon tetrachloride for a period of between about 10 minutes and about 1.5 hours at a temperature in the range of between about 15° C. and about 50° C., followed by a heating at a temperature in the range of between 30° C. and about 100° C. for a period in the range of between about 10 minutes and about 1.5 hours; and
  (d) contacting the product of step (c) with vanadium oxychloride at about ambient temperature for a period in the range of between about 30 seconds to about 5 minutes, the product of which is contacted with tetracresyl titanate for a period in the range of between about 2 minutes and about 10 minutes at about ambient temperature, the product which is contacted with titanium tetrachloride at a temperature in the range of between about 80° C. and about 100° C. for a period in the range of between about 45 minutes and about 1.5 hours;
(II) triethylaluminum; and
(III) isobutylisopropyldimethoxysilane.

29. A process in accordance with claim 28 wherein said silica is pretreated with hexamethyldisilazane prior to said step (a).

* * * * *